Sept. 29, 1964 A. J. SIMMONS 3,150,887
SLEEVE FOR CONNECTING MULTIPLE DUCT PIPE
Filed June 28, 1961 2 Sheets-Sheet 1
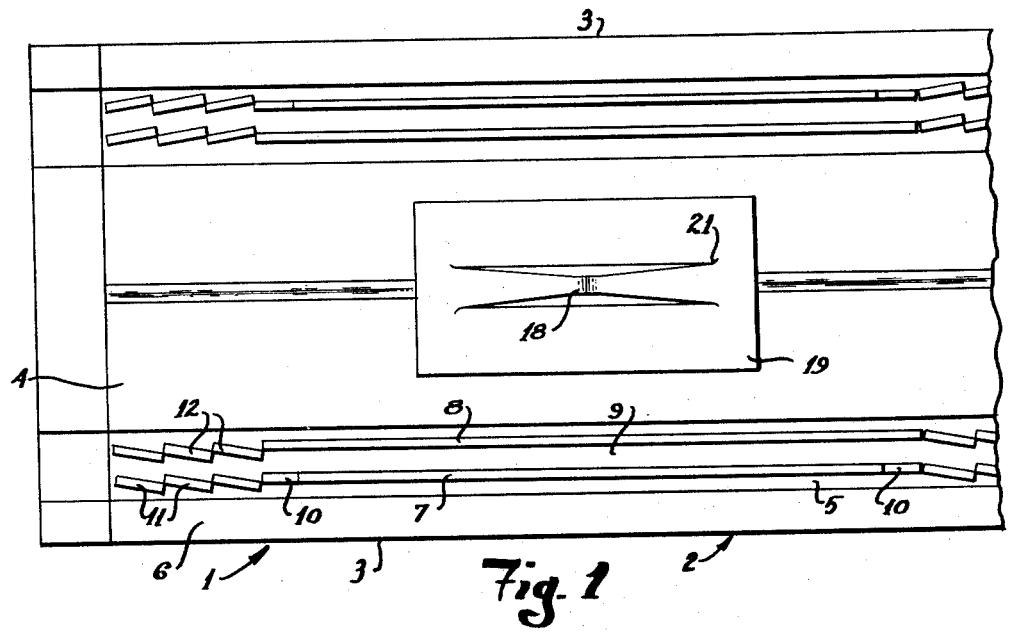
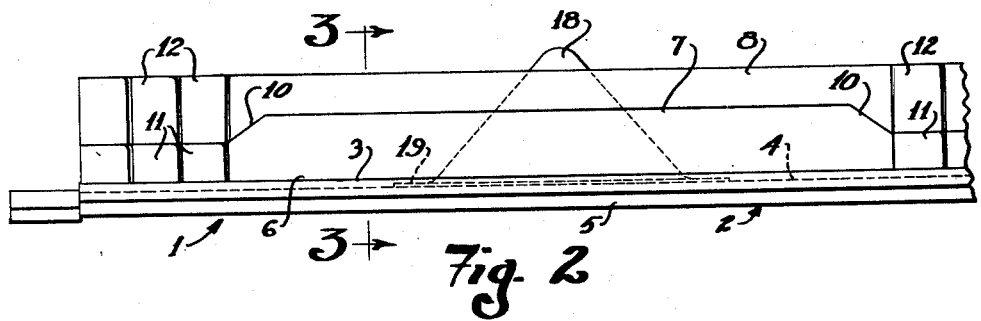
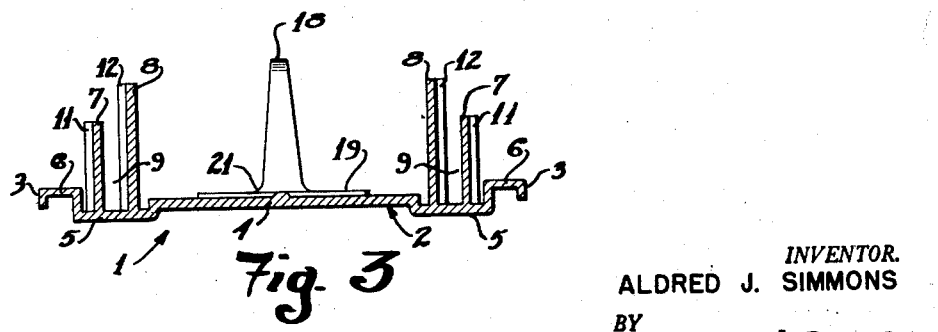
INVENTOR.
ALDRED J. SIMMONS
BY
Andrus & Starke
Attorneys

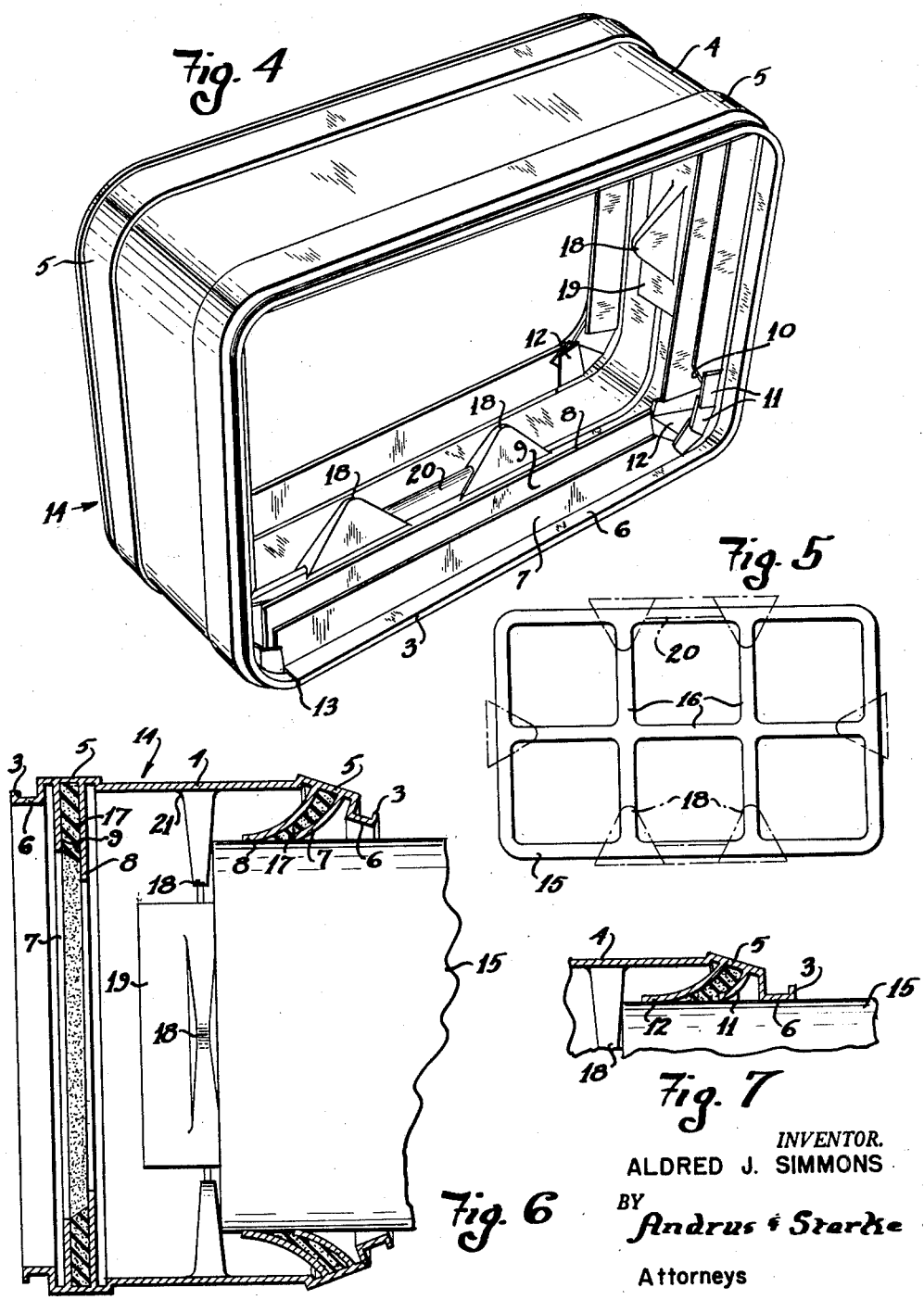

United States Patent Office 3,150,887
Patented Sept. 29, 1964

3,150,887
SLEEVE FOR CONNECTING MULTIPLE
DUCT PIPE
Aldred J. Simmons, Sheboygan, Wis., assignor to Plymouth Industrial Products, Inc., Plymouth, Wis., a corporation of Wisconsin
Filed June 28, 1961, Ser. No. 120,336
4 Claims. (Cl. 285—231)

This invention relates to a pipe connector, and more particularly to a sleeve for connecting multiple duct tile or the like.

The advantages of sleeves of this type are set forth in U.S. Patent No. 2,890,899, owned by the assignee of the present invention.

According to the present invention, the pipe connector may be formed from a length or strip of plastic material which is previously molded to the desired cross sectional configuration. The strip is cut and bent to the desired rectangular shape and the abutting edges secured together.

A plurality of ribs are molded into the strip and these ribs serve to support and confine a mastic sealant for a pipe end inserted into the finished connector. The ribs are interrupted at the points where the molded strip is bent to form corners, and means are provided to nevertheless confine the mastic at the corners.

Other novel features will be disclosed hereinafter.

The accompanying drawings illustrate the best mode presently contemplated by the inventor for carrying out the invention.

In the drawings:

FIGURE 1 is a top plan view of an end fragment of a molded strip from which the connector may be fabricated;

FIG. 2 is a side elevation of the strip of FIGURE 1;

FIG. 3 is a transverse section taken on line 3—3 of FIG. 2;

FIG. 4 is a perspective view of a pipe connector constructed in accordance with the invention;

FIG. 5 is an end view of a pipe adapted to be inserted into the connector, with the position of the stop tabs of the connector being shown in phantom;

FIG. 6 is a vertical longitudinal section of the connector, with the inserted pipe shown in elevation; and FIG. 7 is a fragmentary section of a corner of the connector with the pipe inserted.

As shown in FIGS. 1–3 of the drawings, the pipe connector is adapted to be formed from a strip 1 of resilient flexible plastic material, such as a fiber reinforced thermoplastic. It has been found that low density polyethylene copolymer reinforced with relatively short asbestos fibers having a relatively large length to diameter ratio is very suitable for this purpose.

Strip 1 is suitably molded to form a longitudinally extending base 2 which subsequently forms the outer wall of the connector. Base 2 is relatively thin and is formed to provide a pair of edge channel members 3. The inner walls of channels 3 are joined to the central base portion 4 of the strip by a depressed ridge 5 which forms a recess therebetween.

As best seen in FIG. 3, the upper surface of each channel 3 forms a longitudinal flat shelf 6, for purposes to be described, and which is substantially higher than base portion 4 or ridge 5.

Each ridge 5 forms the base or connecting root for a plurality of flexible sealing ribs which are spaced from each other and from the longitudinal edges of the ridge. In the present embodiment, outer rib 7 and inner rib 8 extend upwardly at 90° from the plane of base 2. Ribs 7 and 8 are thus parallel and spaced apart to provide a mastic-receiving pocket 9 therebetween. The upper edge of each rib 8 is substantially higher than the corresponding upper edge of each rib 7.

As shown, each rib 7 and 8 is interrupted a number of times corresponding to the number of corners desired in the finished connector, thus forming a plurality of rib segments.

The ends of the separated segments of each rib 7 are angularly shaped, as at 10, and the space therebetween is filled with a plurality of flexible iris members 11 which are substantially lower than the rib. Iris members 11 are disposed in substantially edge-to-edge longitudinal arrangement.

Directly behind irises 11, and between the segments of ribs 8, lie another series of flexible iris members 12 of substantially the same height as ribs 8. As with the shorter irises 11, irises 12 are disposed in substantially edge-to-edge longitudinal arrangement, and in effect form an extension of the respective ribs.

The iris members 11 and 12 are rooted in ridge 5, and the plane of each individual iris is offset at a slight angle from the longitudinal. Thus, when strip 1 is bent and the ends thereof overlapped at 13 and integrally joined under heat and pressure to form the completed connector 14 (FIG. 4), the respective irises will overlap each other to sealingly close the space between the ends of the respective rib segments. The iris members are generally aligned with pockets 9.

Connector 14 is shown as being rectangular, although other configurations, such as triangular, could be utilized without departing from the spirit of the invention.

As shown in FIGS. 5–7, connector 14 is adapted to circumferentially surround and join the ends of a pair of aligned multiple duct tile sections 15. The tile is shown as having six ducts separated by interior walls 16.

In utilizing the connector of the invention, the pockets 9 are filled with a suitable pipe sealing mastic 17, such as that disclosed in the above-mentioned Patent No. 2,890,899. The mastic should extend to slightly above the upper edge of ribs 7 and also fill the spaces between the irises 11 and 12 at the corners.

A tile 15 may then be inserted into openings provided by the connector 14, and it will travel relatively freely parallel to the shelf 6 of the particular channel 3. As further end pressure is applied, the tile will engage the lower portions of ribs 7 and irises 11 and will force the upper edge of ribs 7 to closely adjacent the front faces of ribs 8. As this occurs, more mastic 17 will be forced over the top edges of ribs 7 and will be applied to the outer periphery of the tile wall and to some small extent to the end portion, even though chips or the like may exist therein.

Subsequently, both radially extending ribs 7 and 8 will be forced inwardly and ridge 5 will pivot about the edge or joint line with base portion 4, causing the roots of ribs 7 and 8 and their respective irises to move in an arcuate path, the arc for ribs 7 and irises 11 being the longest. As the ribs and irises flex toward a position more generally parallel to base 2 to permit the tile to pass, some mastic 17 will tend to flow from between the irises 11 and 12 into pockets 9. This tends to provide a continuous seal between the corners and side wall pockets.

FIG. 6 shows the relationship between the pipe and connector along a straight edge. It can be seen that ridge 5 will have pivoted slightly, but that shelf 6 will be spaced from the outer wall of the tile. This space will be slightly smaller at the bottom, due to the weight of the tile.

FIG. 7 shows the relationship of the parts at the corners. It is apparent that shelf 6 will be pulled up tight against the tile. This is due to the excess resistance to bending of the rib ends relative to the irises, thus causing the corners of the connector to bend toward the tile. In addition, while irises 11 and 12 overlap in a connector free of a pipe, the adjacent irises will straighten out into substantially edge-to-edge relationship when the pipe is within the connector.

The arcuately flexed ribs 7 and 8 and the irises 11 and 12 will prevent penetration of mastic inwardly of a plane containing the pockets. In addition, substantial mastic will be positioned radially inwardly from the inner edges of ribs 7 along the inner face of ribs 8, and from the inner edges of irises 11 along the inner faces of irises 12, where contact with the outer tile wall occurs. A complete circumferential seal is thus assured. The resiliency of ribs 7 and 8 and irises 11 and 12 maintains them in tight engagement with the tile walls. The inner edge of rib 7 will in most instances remain slightly separated from the face of rib 8, although touching can occur.

The end of the tile is prevented from advancing beyond the center of base 2 by stop means, which comprise in this instance a plurality of triangularly shaped stop tabs 18 extending radially inwardly from base 2. Base 2 is thickened at 19 around each tab 18. Where more than one tab is disposed on a side, a rib-like support 20 connects them. The thickness of tabs 18, base portions 19 and supports 20 are such as to discourage tipping of the tabs as they are engaged by the pipe end. The joint between each tab 18 and base 4 is provided with a radical portion 21 to help spread the load when a tile is in contact with a tab.

Each tab 18 is positioned so that its apex is disposed only adjacent the joint between the outer wall of the tile 15 and a partition wall 16, as shown in FIG. 5. This, plus the triangular shape assures that substantially no mastic on the end of the tile will be forced into the tile duct opening at points remote from the corner of the duct.

Once a tile is disposed on one side of the connector, the second tile is inserted into the other opposing side to complete the joint. The final assembly is effectively sealed from leakage of underground water, silt and the like.

In some instances, it may be possible to mold the connector in a single integral piece without departing from the spirit of the invention. In addition, the invention is not to be construed as limited to short radius corners or perfectly straight side walls and tabs. Quite large radius corners and curved side walls and tabs may also be utilized.

The connector of the invention combines a number of features which provide a degree of sealing hitherto unknown in this particular art. The placement of shelf 6 above ridge 5, the use of corner irises with the outer irises shorter than the inner ones, the placement of ribs 7 and 8 with their roots spaced from the edge of the recess of ridge 5, etc., all combine to provide the substantially improved seal, which is continuous around the circumference of the connector, including the corners. The connector may be applied with a minimum of endwise force.

Various modes of carrying out the invention are contemplated as being within the scope of the following claims particularly pointing out and distinctly claiming the subject matter which is regarded as the invention.

I claim:

1. A resilient flexible connector for pipe having interior partitions joining the pipe wall to define multiple ducts, said connector comprising:
    (a) an outer wall adapted to circumferentially surround a pipe end and having generally straight portions joined by corners,
    (b) said outer wall providing a pair of opposed circumferential openings each of which is adapted to receive a pipe thereinto,
    (c) a channel member forming the edge portion of each opening and providing a flat shelf,
    (d) a ridge integrally joining each channel member with said wall and with said ridge being deformed radially outwardly from said channel member and said wall to form a recess joined to said wall along a circumferential line,
    (e) a pair of transversely spaced flexible ribs integral with and extending radially inwardly from said deformed ridge along each generally straight portion of said outer wall,
    (f) the inner rib of each rib pair being of greater height than the corresponding outer rib and forming therewith a pocket,
    (g) a plurality of overlapping flexible iris members disposed between corresponding inner and outer ribs of adjacent rib pairs at the said corners and being integral with and extending radially inwardly from said deformed ridge,
    (h) said iris members being offset at an angle to the general plane of the said pockets and forming continuations thereof at the corners of the connector,
    (i) pipe sealing mastic material disposed in said pockets and the continuations thereof,
    (j) the above construction providing that when a pipe is inserted into one of said openings:
        (1) the said channel member, ridge, rib pairs and irises will move arcuately inwardly about said circumferential line,
        (2) said ribs and iris members will flex arcuately inwardly so that the edges thereof are in resilient engagement with the pipe wall with said mastic confined between the said edges and in sealing engagement with the said wall,
        (3) adjacent iris members will assume a non-overlapping relationship,
        (4) and said flat shelf will seal tightly against the pipe wall at the corners,
    (k) and at least one triangular stop tab integral with and extending radially inwardly from said outer wall for limiting the distance of insertion of a pipe into the connector,
    (l) said stop tab having its apex disposed for engagement by an interior partition of the said pipe adjacent the pipe wall.

2. A pipe joint comprising:
    (a) a pipe having interior partitions joining the pipe wall to define multiple ducts,
    (b) said pipe wall having generally straight side portions joined by corners,
    (c) a resilient flexible connector wall circumferentially surrounding the pipe end and having straight portions and corners corresponding to those of the pipe wall,
    (d) said connector wall being spaced radially outwardly from the said pipe wall,
    (e) a ridge integrally joined to said connector wall along a circumferential line and tapering toward said pipe wall from said line,
    (f) a flexible channel member integrally joined to said ridge and forming the edge of the connector,
    (g) said channel member providing a flat shelf spaced from the said pipe wall along the straight side portions thereof and in tight sealing engagement with the corners of said pipe wall,
    (h) a pair of transversely spaced flexible resilient ribs integral with said ridge along each straight portion of said connector,
    (i) each rib of said rib pair being arcuately bent toward the pipe wall so that the edge of the rib is in resilient sealing engagement with the said pipe wall and spaced from the other rib of the pair to form a pocket,
    (j) a plurality of flexible iris members disposed in substantially edge-to-edge relationship between corresponding inner and outer ribs of adjacent rib pairs and engaging said pipe wall at the said corners,
    (k) said iris members being integral with said ridge and being offset at an angle to the general plane of the pockets and forming continuations thereof, (*l*) pipe sealing mastic material confined in said pockets and continuations thereof and in sealing engagement with the pipe wall, (*m*) and at least one triangular stop tab integral with and extending radially inwardly from said outer wall and in engagement with an interior partition of said pipe adjacent the pipe wall.

3. A pipe joint comprising:

(*a*) a pipe providing an exterior wall having generally straight side portions joined by corners, (*b*) a resilient flexible connector wall circumferentially surrounding the end of said pipe and having straight portions and corners corresponding to those of the pipe wall, (*c*) said connector wall being spaced radially outwardly from the said pipe wall, (*d*) a ridge integrally joined to said connector wall along a circumferential line and tapering toward said pipe wall from said line, (*e*) a pair of transversely spaced flexible resilient ribs rooted in said ridge along each straight portion of said connector, (*f*) each rib of said rib pair being arcuately bent toward the pipe wall so that the edge of the rib is in resilient sealing engagement with the said pipe wall and spaced from the other rib of the pair to form a pocket, (*g*) mastic material confined in said pockets and in sealing engagement with the pipe wall, (*h*) and means disposed at said corners of said pipe wall and said connector and providing a seal therebetween.

4. A pipe joint comprising:

(*a*) a pipe providing an exterior wall having generally straight side portions joined by corners, (*b*) a resilient flexible connector wall circumferentially surrounding the end of said pipe and having straight portions and corners corresponding to those of the pipe wall, (*c*) said connector wall being spaced radially outwardly from the said pipe wall, (*d*) a ridge integrally joined to said connector wall along a circumferential line and tapering toward said pipe wall from said line, (*e*) sealing means extending from said ridge along each straight portion of said connector and providing a seal between the straight portions of the connector and said pipe wall, (*f*) a plurality of flexible iris members disposed in substantially edge-to-edge relationship and extending radially between corresponding corner portions of said connector and said pipe wall, (*g*) said iris members being rooted in said ridge and being offset at an angle to the general plane thereof and forming pockets providing a continuation of said sealing means, (*h*) and mastic material confined in said pockets and in sealing engagement with the pipe wall.

References Cited in the file of this patent
UNITED STATES PATENTS

| | | |
|---|---|---|
| 374,348 | Cook | Dec. 6, 1887 |
| 2,313,074 | Jewell | Mar. 9, 1946 |
| 2,722,978 | Frisk | Nov. 8, 1955 |
| 2,728,982 | Merril | Jan. 3, 1956 |